(12) United States Patent
Koch et al.

(10) Patent No.: US 7,521,940 B2
(45) Date of Patent: Apr. 21, 2009

(54) CAPACITIVE SENSING ISOLATION USING REVERSED BIASED DIODES

(75) Inventors: Stu Koch, West Bloomfield, MI (US); Phil Maguire, Royal Oak, MI (US)

(73) Assignee: TK Holdings Inc., Auburn Hills, MI (US)

(*) Notice: Subject to any disclaimer, the term of this patent is extended or adjusted under 35 U.S.C. 154(b) by 217 days.

(21) Appl. No.: 11/698,275

(22) Filed: Jan. 26, 2007

(65) Prior Publication Data

US 2007/0208529 A1    Sep. 6, 2007

Related U.S. Application Data

(60) Provisional application No. 60/762,125, filed on Jan. 26, 2006.

(51) Int. Cl.
*G01R 27/26* (2006.01)
(52) U.S. Cl. ............ 324/661; 324/672; 324/76.11
(58) Field of Classification Search ............ 324/658, 324/661, 672, 76.11
See application file for complete search history.

(56) References Cited

U.S. PATENT DOCUMENTS

| 2001/0045733 | A1 | 11/2001 | Stanley et al. |
| 2004/0125096 | A1* | 7/2004 | Kigo et al. ............... 345/204 |
| 2006/0126245 | A1* | 6/2006 | Grose et al. ............... 361/82 |

FOREIGN PATENT DOCUMENTS

| DE | 43 38 285 A1 | 5/1995 |
| DE | 103 11 132 A1 | 9/2004 |
| FR | 2 841 841 | 1/2004 |

* cited by examiner

*Primary Examiner*—Vincent Q Nguyen
(74) *Attorney, Agent, or Firm*—Foley & Lardner LLP

(57) ABSTRACT

A capacitive sensor is provided. The capacitive sensor includes a sensor/heat pad for outputting a sensing signal, a first diode coupled to a first node of the sensor/heat pad, a second diode coupled to a second node of the sensor/heat pad, a first transistor coupled to the first diode and a second transistor coupled to the second diode. During a sensing mode, the first and second transistors are opened and a reverse-biased signal is applied to the first diode and the second diode so that the sensor/heat pad is isolated from the first and second transistors.

22 Claims, 3 Drawing Sheets

US 7,521,940 B2

CAPACITIVE SENSING ISOLATION USING REVERSED BIASED DIODES

CROSS-REFERENCE TO RELATED APPLICATION

The instant application claims the benefit of U.S. Provisional Application Ser. No. 60/762,125, filed on Jan. 26, 2006, which is incorporated herein by reference.

BACKGROUND

The present invention relates to occupant classification systems.

A capacitive sensing system for a vehicle seat sends a time varying voltage out to a single sensing electrode and measures the loading current to ground from the sensing electrode. The time varying voltage could take many shapes, although a preferred shape is a sinusoidal signal at frequencies between about 50 kHz and about 150 kHz. The loading current increases significantly when an adult occupant is on the seat and only slightly when there is a child seat on the vehicle seat.

Generally, a capacitive sensing system uses one element for both sensing an occupant in a vehicle seat and heating the vehicle seat. Typically, to switch between heating and sensing, high-side and low-side FETs are switched on (heating) and off (sensing) to apply and isolate power and ground respectively. However, one drawback to FETs is that they may have a parasitic capacitance that can affect the sensing measurements.

Accordingly, a system is needed for providing better performance from the inside impedances of the capacitive sensing system.

SUMMARY

According to one embodiment of the invention, a sensor includes a sensor/heat pad for outputting a sensing signal, a first diode coupled to a first node of the sensor/heat pad, a second diode coupled to a second node of the sensor/heat pad, a first transistor coupled to the first diode and a second transistor coupled to the second diode. During a sensing mode, the first and second transistors are opened and a reverse-biased signal is applied to the first diode and the second diode so that the sensor/heat pad is isolated from the first and second transistors.

According to another embodiment of the invention, the sensor includes a reference circuit for measuring the effects of temperature on the sensing signal and outputting a reference sensing measurement that can be used to adjust the sensing signal.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Embodiments of the present invention will be described with reference to the drawings. Like numbers are used throughout the drawings to refer to the same or similar parts in each of the embodiments of the invention described herein.

Figure 1:
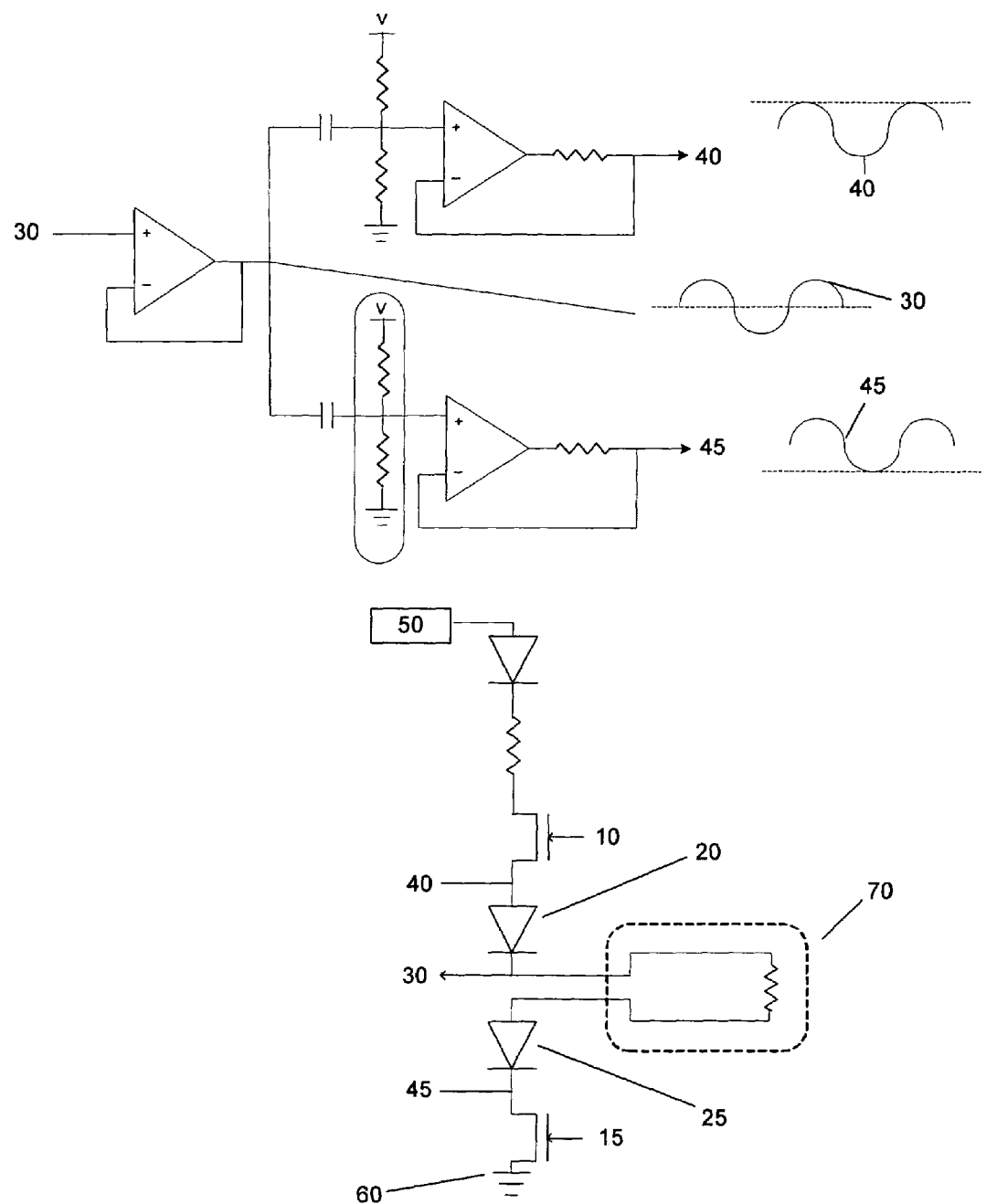
FIG. 1 is a schematic diagram that shows a driven shield signal concept and isolation diodes in the high current path; when sensing, the FETs are open, the diodes are reverse biased, and the driven shield signal is applied between the diodes and the FETs.

FIG. 1 shows a capacitive sensing system 1 according to one aspect of the invention. A capacitive sensing signal used for detecting an occupant is produced by a sense/heating pad 70. The capacitive sensing system 1 isolates the capacitive sensing signal 30 from the FETs 10, 15 during sensing by using diodes 20, 25 and reverse-biased signals applied to ensure the diodes 20, 25 will not conduct current. The capacitive sensing signal 30 is sinusoidal in FIG. 1, but could be another time-varying type of signal. During the sensing mode, a buffered sensing signal with a DC offset less than the original signal 40 is applied to the high-side diode 20 anode; effectively reverse-biasing the diode 20 which will isolate the high-side FET 10 from the sensing circuit. Likewise, a buffered sensing signal with a DC offset greater than the original signal 45 is applied to low-side diode 25 cathode effectively reverse biasing the diode 25 which isolates the low-side FET 15. These buffered signals 40, 45 are referred to as driven shield signals. The DC offsets across the diodes 20, 25 could also be zero or slightly positive and use the same concept described here.

When heating, the FETs 10, 15 are closed and DC current flows from the battery 50 to ground 60. Sensing is not attempted while heating. When sensing, the FETs 10, 15 are open and the reverse biasing driven shield signals 40, 45 are applied to the nodes between the FETs 10, 15 and the diodes 20, 25. The diodes 20, 25 act as large impedances and very little current flows from the sensing node. The diodes 20, have a capacitance across them that can conduct the high frequency sensing signal. However, the driven shield signal 40, 45 reduces the high frequency current through the diodes to near zero levels because the high frequency components of the signal on both sides of the diode are nearly identical.

Figure 2:
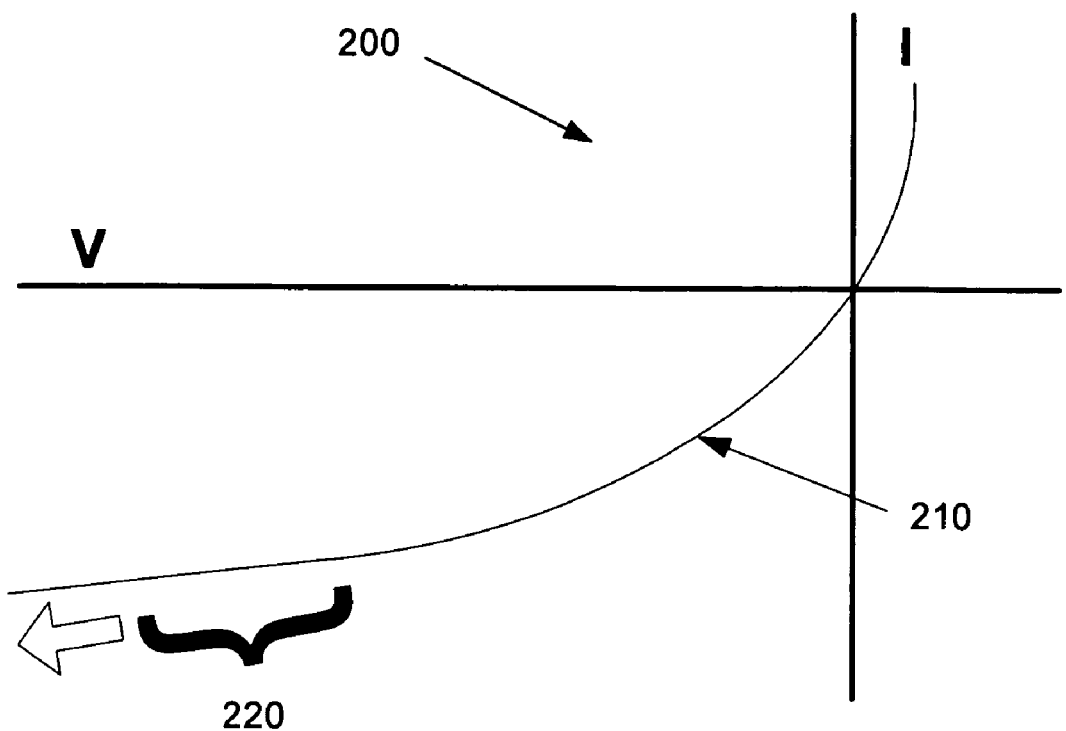
FIG. 2 is an I-V graph for the reverse bias diodes; the bias across the diode should be set such that operation takes place beyond the knee of the curve.

According to one aspect of the invention, an I-V characteristic curve 200 of the diodes 20, 25 is shown in FIG. 2. Ideally, the diode 20, 25 has a reverse biased leakage current that does not change with temperature. Realistically, however, the diode's 20, 25 characteristic will change with temperature, so it is important to operate the diode 20, 25 (when sensing) at a reverse bias level beyond the knee 210 of the I-V characteristic curve of the diode 20, 25. This operational region 220 is shown in FIG. 2.

Figure 3:
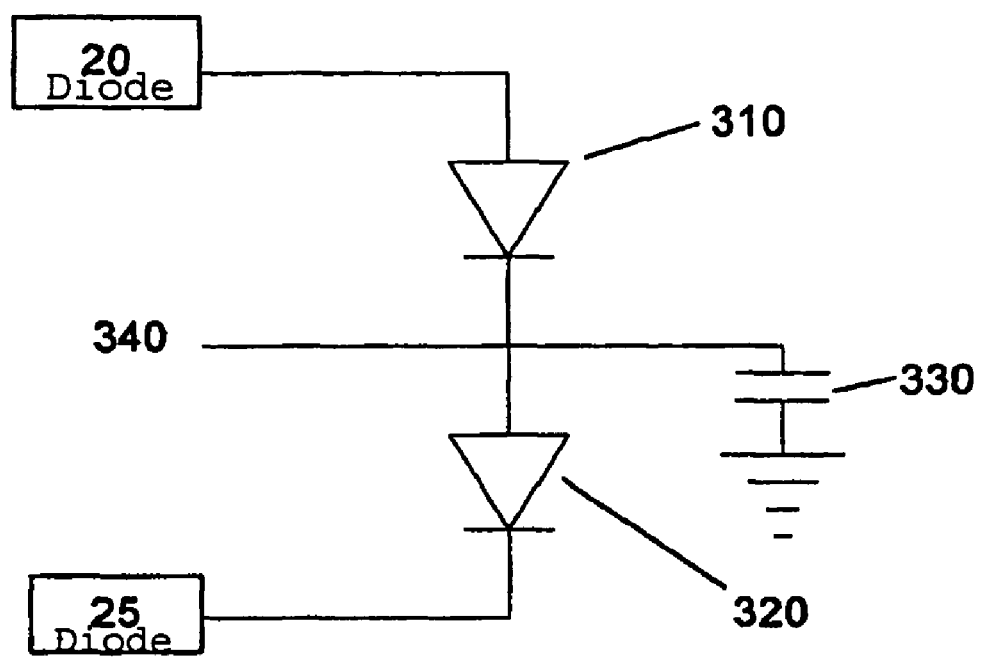
FIG. 3 is a circuit diagram in which (a) diodes with similar characteristics as the ones in the heating circuit, (b) the same driven shield signals as the regular sensing circuit, and (c) a reference capacitor, are used to determine if compensation of the measurements is needed due to characteristics of the diodes.

There will be some drift of the capacitive sensing system 1 due to temperature effects on the diode reverse leakage currents. One method of compensating temperature effects on this part of the system is to use a "dummy" set of reverse biased diodes 310, 320 as shown in FIG. 3. Preferably, according to one aspect of the invention, the dummy diodes 310, 320 are placed close to the isolation diodes 20, 25 so that they experience the same temperature as the isolation diodes 20, 25.

If temperature affects the measurement of the reference capacitor 330 shown in FIG. 3, then it will also affect the regular sensing measurement 30. The reference sensing measurement 340 can be used to compensate the regular sensing measurement 30. For example, if more current flows out of the reference sense node because the reverse bias leakage current has increased in the diodes 310, 320 in FIG. 3, due to high temperature, then this should be used to adjust down the calculated measurement of the regular sensing node 30.

The above-described system has several advantages. Embodiments of the present invention allow the use of diodes instead of Field Effect Transistors ("FETs") for the inside impedances in a four impedance isolation concept. Diodes can be less expensive than the FETs, can have better characteristics for this application (lower capacitance), and do not require any control or drive signal circuitry.

Given the disclosure of the present invention, one versed in the art would appreciate that there may be other embodiments and modifications within the scope and spirit of the invention. Accordingly, all modifications attainable by one versed in the art from the present disclosure that are within the scope and spirit of the present invention are to be included as further embodiments of the present invention.

What is claimed:

1. A sensor, comprising:
a sensor/heat pad for outputting a sensing signal;
a first diode coupled to a first node of the sensor/heat pad;
a second diode coupled to a second node of the sensor/heat pad;
a first transistor coupled to the first diode; and
a second transistor coupled to the second diode, wherein during a sensing mode, the first and second transistors are opened and a reverse-biased signal is applied to the first diode and the second diode so that the sensor/heat pad is isolated from the first and second transistors.

2. A sensor as claimed in claim 1, further comprising:
a power source coupled to the first transistor and wherein the second transistor is coupled to ground.

3. A sensor as claimed in claim 2, wherein during a heating mode, the first and second transistors are closed and a current flows from the power source to ground.

4. A sensor as claimed in claim 1, wherein the sensing signal is sinusoidal.

5. A sensor as claimed in claim 1, wherein during the sensing mode a buffered sensing signal with a DC offset less than the sensing signal is applied to the first diode.

6. A sensor as claimed in claim 1, wherein during the sensing mode a buffered sensing signal with a DC offset greater than the sensing signal is applied to the second diode.

7. A sensor as claimed in claim 1, further comprising a reference circuit for measuring the affects of temperature on the sensing signal due to the characteristics of the first and second diodes and outputting a reference sensing measurement that can be used to adjust the sensing signal.

8. A sensor as claimed in claim 7, wherein the reference circuit further comprises:
a set of reverse biased diodes positioned in close proximity to the first diode and the second diode; and
a reference capacitor coupled to the set of reverse biased diodes.

9. A sensor as claimed in claim 1, wherein the first transistor and second transistor are field effect transistors (FETs).

10. A method for sensing an occupant in a seat comprising:
providing a sensor/heat pad for outputting a sensing signal;
coupling a first diode to a first node of the sensor/heat pad;
coupling a second diode to a second node of the sensor/heat pad;
coupling a first transistor to the first diode;
coupling a second transistor to the second diode; and
during a sensing mode, opening the first and second transistors and applying a reverse-biased signal to the first diode and the second diode so that the sensor/heat pad is isolated from the first and second transistor.

11. A method for sensing an occupant in a seat as claimed in claim 10, further comprising:
coupling a power source to the first transistor; and
coupling the second transistor to ground.

12. A method for sensing an occupant in a seat as claimed in claim 11, comprising:
during a heating mode, closing the first and second transistors; and
enabling the power source so that a current flows from the power source to ground.

13. A method for sensing an occupant in a seat as claimed in claim 10, further comprising:
providing a reference circuit for measuring the affects of temperature on the sensing signal due to the characteristics of the first and second diodes; and
outputting a reference sensing measurement that can be used to adjust the sensing signal.

14. An occupant sensor for sensing an occupant in a seat, comprising:
a sensor/heat pad for outputting a sensing signal;
a first diode coupled to a first node of the sensor/heat pad;
a second diode coupled to a second node of the sensor/heat pad;
a first transistor coupled to the first diode; and
a second transistor coupled to the second diode, wherein during a sensing mode, the first and second transistors are opened and a reverse-biased signal is applied to the first diode and the second diode so that the sensor/heat pad is isolated from the first and second transistors.

15. A sensor, comprising:
a conductor used to sense at high frequencies and conduct current at low frequencies;
a first diode coupled to a first node of the conductor;
a second diode coupled to a second node of the conductor;
a first transistor coupled to the first diode; and
a second transistor coupled to the second diode, wherein during a sensing mode, the first and second transistors are opened and a driven shield signal is applied to the first diode and the second diode so that the conductor is isolated from the first and second transistors.

16. A sensor as claimed in claim 15, further comprising:
a power source coupled to the first transistor and wherein the second transistor is coupled to ground.

17. A sensor as claimed in claim 16, wherein during a heating mode, the first and second transistors are closed and a current flows from the power source to ground.

18. A sensor as claimed in claim 15, wherein the sensing signal is sinusoidal.

19. A sensor as claimed in claim 15, wherein the conductor is a wire.

20. A sensor as claimed in claim 15, wherein during the sensing mode a buffered sensing signal with a DC offset less than the sensing signal is applied to the first diode.

21. A sensor as claimed in claim 15, wherein during the sensing mode a buffered sensing signal with a DC offset greater than the sensing signal is applied to the second diode.

22. A sensor, comprising:
a sensor/heat pad;

a first diode coupled to a first node of the sensor/heat pad;
a second diode coupled to a second node of the sensor/heat pad;
a first transistor coupled to the first diode; and
a second transistor coupled to the second diode, wherein during a sensing mode, the first and second transistors are opened and a driven shield signal is applied to the first diode and the second diode so that the sensor/heat pad is isolated from the first and second transistors.

* * * * *